United States Patent Office
3,657,132
Patented Apr. 18, 1972

3,657,132
CABLE OIL HAVING ETHYLENE-PROPYLENE POLYMER DISPERSED THEREIN
Henri Gourlaouen and Marcel Ostyn, Mont Saint Aignan, France, assignors to Esso Research and Engineering Company
No Drawing. Filed Aug. 27, 1969, Ser. No. 853,546
Claims priority, application France, Aug. 28, 1968, 164,442
Int. Cl. H01b 3/22, 7/00
U.S. Cl. 252—63
8 Claims

ABSTRACT OF THE DISCLOSURE

The solid material formed during the copolymerization of ethylene and propylene in mol ratio of 6:4 to 3:7 in the presence of a catalyst and solvent, which copolymerization is terminated when the weight ratio of solvent to total dissolved copolymer is from 10:7 to 1:3, is used for thickening insulating oils to render them suitable for use in filled cables.

---

The present invention relates to additives for use in filled cables, as well as to compositions comprising the additives, and cables filled with the said compositions.

Insulating oils for cables fall into two categories, namely:

(a) Liquid oils for hollow cables for very high voltage applications (that is to say, voltages exceeding 100 kilovolts). Such oils may be derived from mineral oils and may have very low dielectric losses (tangent δ being in the region of 0.0005 at 100° C.).

(b) Solid compositions known as "compounds" for filled cables used for voltages below 100 kilovolts. In the past, compounds have generally been made by the addition to a liquid base of up to about 30 wt. percent solid materials such as waxes, colophony and resins. These previously known compounds have relatively poor electrical properties—for example, if the liquid base is a refined mineral oil, a typical dielectric loss would be of the order of tan δ=0.0030, and with the passage of time, the dielectric loss tends to increase considerably: thus, if such a previously known compound is maintained at 125° C. for 3 hours in an oxidising environment, tan δ rises to about 0.0200.

According to the present invention, an additive for use in filled cables consists of the solid material formed in the copolymerisation products of ethylene and propylene when the mol ratio of ethylene to propylene is from 6:4 to 3:7, the copolymerisation being effected at temperatures from —40° C. to +80° C. in the presence of a solution of an organo-metal catalyst, and the weight ratio of solvent to total dissolved copolymer being from 10:7 to 1:3.

The solid material is removed from the reactants by any suitable method—e.g. filtration or centrifuging, preferably after the catalyst has been decomposed and removed from the reactants.

The organo-metal catalyst may comprise:

(1) A compound of at least one heavy metal of subgroup B of groups IV to VIII of the Mendeleev Periodic Table and
(2) Any one of the following materials:

(a) an organic compound of a metal of Groups I to IV of the Mendeleev Periodic Table.
(b) a metallic or organo-metallic hydride,
(c) a halogenated organo-metallic compound.

Preferably the metal in class 2(a) is from Group II or Group III of the Periodic Table.

The catalyst may be formed in situ in the solvent.

The organo-metal catalyst may be a mixture of titanium tetrachloride and an aluminium trialkyl, the alkyl groups each having from 1 to 10 carbon atoms, preferably 2 or 3 carbon atoms, and the mol ratio of titanium tetrachloride to the aluminium trialkyl being from 1:1 to 10:1.

The additive of the invention may be employed to thicken oil bases of both mineral and synthetic origin without substantially impairing their electrical properties.

Thus, when the oil base is a mineral oil which has been refined to provide good dielectric properties, a suitable compound for filled cables may be prepared by forming a composition of the mineral oil and from 1 to 35 wt. percent, or more preferably 4 to 15 wt. percent, of the solid material.

A synthetic oil having suitable dielectric and aging properties to be used as a base oil for a cable filling compound may also be conveniently obtained during the above-described copolymerization process of ethylene and propylene, by which the solid additive of the invention is formed, by decomposing the organo-metal catalyst (e.g. by the addition of water and ethanol), and decanting the copolymer/solvent oily layer from the aqueous layer containing the decomposed catalyst: the solvent for the catalyst, usually an aromatic hydrocarbon, such as xylene, and/or saturated paraffinic hydrocarbon, such as heptane, is then removed by distillation. It is preferred that the copolymer remaining be further distilled to remove products boiling below 300° C. or better still, below 450° C.

The 450° C. copolymer product which is to form the base oil for the compound will already contain about 3 wt. percent of solid material in suspension before the solid material of the invention is added thereto to form the compound.

Optionally, the copolymer base oil may be hydrogenated over a suitable hydrogenation catalyst, such as nickel, under the following conditions:

Pressure—30 to 150 bars (more preferably, 40 to 70 bars)
Temperature—200 to 380° C. (more preferably, about 260° C.)
Space velocity—(vol. of liquid polymer/vol. of catalyst/hr.)—0.5–3.0 (preferably about 1.0)
Volume ratio of $H_2$ (at N.T.P.) to Liquid polymer.—100–500 (preferably 150–300)

Preferably the compound formed from the copolymer base oil and the added solid material comprises from 1 to 70 wt. percent of the latter: usually the amount of added solid matter will comprise from 3 to 50 wt.: of the composition.

The compounds formed in accordance with the invention have excellent dielectric and aging properties, and are of suitable consistency for use in filling cables.

The invention also includes cables filled with the compounds described hereinabove.

The invention will now be described by way of a non-limitative example.

EXAMPLE

A polymerization catalyst was prepared according to the following procedure: 2 litres of heptane were dried by passage through a molecular sieve and disposed in a flask which had previously been flushed out with dry nitrogen. The flask was cooled to 0° C. and 3.42 grams of aluminum triethyl were stirred into the heptane, followed by 17.1 grams of titanium tetrachloride.

The solution was vigorously stirred and nitrogen bubbled therethrough for about 15 minutes, whereafter the nitrogen supply was terminated and a mixture of 50 vol. percent ethylene and 50 vol. percent propylene injected into the flask at a rate of 120 litres per hour for 320 minutes at which time the weight ratio of solvent to polymer was 10/7: during this 320 minute period, the temperature of the flask was maintained substantially at 0° C.

The flask was then flushed with nitrogen, and the activity of the catalyst destroyed by the addition of about 10 mls. of ethanol followed by more than 2 litres of water, the contents of the flask being vigorously stirred.

After a short settling time, the top oily layer was decanted off, water-washed until substantially colourless, and then separated from the aqueous washings.

The resulting oily composition contained in suspension a solid material, and the solid material was isolated by filtration of the oily composition.

The solid material was incorporated in two base oils designated A and B to form compounds suitable for use in a filled cable.

Base oil A was a heavy refined paraffinic base blend of raffinates available under the trade name of "Univolt 130" and having a viscosity at 98.9° C. of 27.5 cst. and a flash point (open vessel) of 315° C.

Base oil B was a synthetic oil prepared by copolymerizing approximately equimolar quantities of ethylene and propylene in the manner described above in relation to the solid material, but omitting the step filtering out the solid material formed in suspension.

The heptane solvent was removed by raising the temperature of the copolymer/solvent mixture to 180° C. and the final base oil B was derived by distilling off all materials boiling below 450° C.

The properties of base Oils A and B relevant to formation of compounds were as follows:

| Base oil | A | B |
| --- | --- | --- |
| Ubbelodhe drop point, ° C | 68.5 | 20 |
| Pour point, ° C | 57 | −9 |
| Tangent δ at 100° C. before aging [1] | 0.0035 | 0.0010 |
| Tangent δ at 100° C. after aging [1] | 0.0062 | 0.0015 |

[1] The aging test is performed by heating 300 grams of the base oil in a 500 cc. beaker for 3 hours whilst exposed to air.

The solid material of the invention was incorporated in the base oils A and B, in the proportion of 5% by weight of the oil A and 50% by weight of the Oil B, to give the respective compounds A¹ and B¹.

The compounds thus formed had the following properties:

| Compound | A¹ | B¹ |
| --- | --- | --- |
| Ubbelodhe drop point, ° C | 82 | 70 |
| Pour point, ° C | 80 | 80 |
| Tangent δ at 100° C. before aging | 0.0034 | 0.0012 |
| Tangent δ at 100° C. after aging | 0.0060 | 0.0017 |

It will be seen that the solid material of the present invention thickens the respective base oils satisfactorily without substantially changing the excellent electrical properties of the base oils.

The solid material of the invention is equally effective for thickening other electrical base oils to form excellent compounds for filling cables.

We claim:
1. A cable insulating composition consisting of at least about 50 wt. percent of a cable oil having a dielectric loss of tangent δ of about 0.001 to about 0.0035 at 100° C. and a thickening amount of the solid material formed in the copolymerization products of ethylene and propylene when the mole ratio of ethylene to propylene is from 6:4 to 3:7, the copolymerization being effected at temperatures from −40° C. to +80° C. in the presence of a solution of an organo-metal catalyst and the weight ratio of solvent to total dissolved copolymer being from 10:7 to 1:3, wherein the dielectric properties of said compositions are substantially unchanged from those of said oil, said oil being a mineral oil having a pour point of at least about 57° C., a Ubbelodhe drop point of at least about 68.5° C. and a flash point of at least 315° C. or a synthetic oil.

2. A composition as claimed in claim 1 in which the organo-metal catalyst is titanium tetrachloride in combination with an aluminum trialkyl, the alkyl groups each having from 1 to 10 carbon atoms and the mol ratio of titanium tetrachloride to aluminum trialkyl being from 1:1 to 10:1.

3. A composition according to claim 1 in which the solid material forms from 1 to 35 wt. percent of the composition.

4. A composition according to claim 1 in which the solid material forms from 4 to 15 wt. percent.

5. The composition for use in filled cables consisting essentially of a synthetic cable oil having a dielectric loss tangent δ of at least about 0.001 at 100° C. and the solid material of claim 1.

6. The composition claimed in claim 5 wherein said synthetic cable oil is the reaction product of the copolymerization of ethylene and propylene at temperatures from about −140° C. to about +80° C. in the presence of a solution of an organo-metal catalyst.

7. A hollow core cable filled with a composition in accordance with claim 1.

8. A hollow core cable filled with a composition in accordance with claim 4.

References Cited

UNITED STATES PATENTS

| | | | |
| --- | --- | --- | --- |
| 3,149,199 | 9/1964 | Pedretti et al. | 252—63 X |
| 3,336,121 | 8/1967 | Jacobson | 252—59 X |
| 3,392,119 | 7/1968 | Mitacek | 252—59 |
| 3,436,349 | 4/1969 | Olund | 252—59 X |
| 3,440,237 | 4/1969 | Mottus | 252—59 X |
| 3,475,369 | 10/1969 | Blunt | 252—59 X |

JOHN T. GOOLKASIAN, Primary Examiner

R. A. DAWSON, Assistant Examiner

U.S. Cl. X.R.

174—110 SR; 252—63.2